Nov. 13, 1934.    R. H. KOPPEL ET AL    1,980,277
MOTOR DRIVEN VEHICLE
Filed Nov. 4, 1932    2 Sheets-Sheet 1

INVENTORS
R. H. Koppel
and J. Linden,
By Watson, Coit, Moore & Grindle
ATTYS.

Nov. 13, 1934.   R. H. KOPPEL ET AL   1,980,277
MOTOR DRIVEN VEHICLE
Filed Nov. 4, 1932   2 Sheets-Sheet 2

INVENTORS
R. H. Koppel
and J. Linden,
By Watson, Coit, Morse & Grindle
ATTYS.

Patented Nov. 13, 1934

1,980,277

UNITED STATES PATENT OFFICE 1,980,277

MOTOR-DRIVEN VEHICLE

Rudolf Heinrich Koppel and Josef Linden, Aachen, Germany, assignors to firm: Rhein-Schelde Gesellschaft für Ingenieurwesen m. b. H., Aachen, Germany Application November 4, 1932, Serial No. 641,276
In Germany November 6, 1931

4 Claims. (Cl. 105—117)

Our invention relates to motor-driven vehicles, and more particularly to vehicles having bogies, for instance, not less than one four-wheeled truck.

It is an object of our invention to improve the means for transmitting power from the motor to the wheels, or two wheels, of the bogie.

To this end, in combination with the usual pivotal means, preferably a spherical centre bearing, for supporting the frame on the bogie, or bogies, and a motor, we provide a divided driving shaft which extends from the motor, or a gearing, to the bogie co-axially through the centre bearing or the like, and we further provide two couplings for connecting the parts of the divided driving shaft. One of the couplings is of the sliding type, i. e. its members are free to move in axial direction with respect to each other but are held against relative rotation, and the other coupling is transversely resilient. The first-mentioned coupling deals with the vertical relative displacement of the vehicle and its bogie, or bogies, and the other deals with the rocking movement of the corresponding bogie.

Preferably the two couplings are combined into a single unit, with sliding and transversely resilient coupling means.

In a vehicle having a spherical centre bearing, we preferably arrange the centre of the resilient clutch at the centre of the sphere which defines the centre bearing.

It is another object of our invention to provide an improved arrangement in a vehicle the motor of which is supported on a subsidiary frame. The subsidiary frame is mounted to rock about a pivot, and we arrange the axis of the pivot at the centre of the transversely resilient coupling. Preferably, the free end of the subsidiary frame is supported on springs.

In the accompanying drawings, a vehicle equipped with our improved power-transmitting means is illustrated more or less diagrammatically by way of example.

In the drawings

Figs. 2 to 4 show somewhat modified power-transmitting means.

Figure 2:
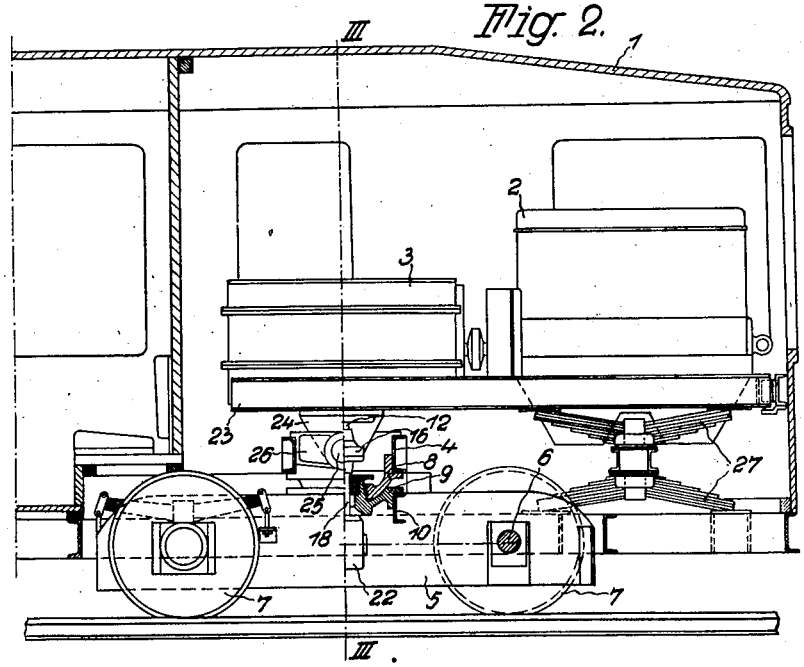
Fig. 2 is a partly sectional elevation showing one end of a vehicle having a four-wheeled bogie, power being transmitted by our improved means to the wheels of the bogie.

Referring now to the drawings, the general arrangement is best seen in Fig. 2. 1 is the car body which will not be described in detail, 23 is the subsidiary frame referred to which will presently be described, 2 is the motor or engine, and 3 is its gear box, both parts being arranged on the subsidiary frame. 5 is a bogie, here shown with four wheels on axles 6, and the usual bearings and springs for supporting the bogie frame on its wheels.

Figure 1:
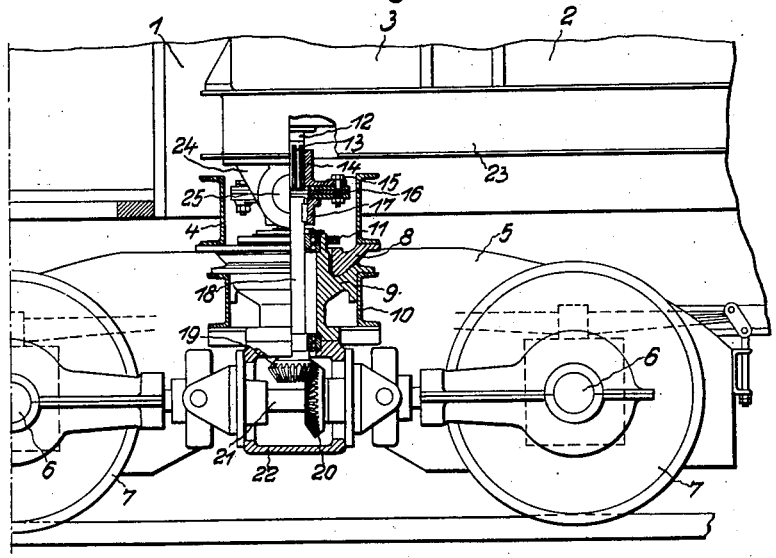
Fig. 1 is an elevation, partly in axial section, of the power-transmitting means.

Referring now particularly to Fig. 1, 4 in which a pair of cross bearers forms the principal frame of the vehicle, and 8 is the annular pivot of the bogie which is attached to the lower faces of the cross bearers 4 and has a spherical face for seating it on the annular centre bearing 9. The centre bearing 9 is supported by two cross bearers 10 of the bogie frame. The centre bearing has an upwardly extending neck which extends through the central opening in the pivot 8, and 11 is a threaded ring at the upper end of the neck for preventing lifting of the car body 1 from the bogie 5.

12 and 18 are the parts of the divided driving shaft to which rotation is imparted from the gearing in the box 3. The upper part 12 has longitudinal flutes 13. 14 is a sleeve which has serrations on its inner face for engaging the flutes 13 of the upper shaft part 12. In this manner, the part 12 and the sleeve 14, which together make up the sliding coupling are held against relative rotation but are free for relative displacement in their axial direction.

17 is a flanged sleeve which is keyed or otherwise held against axial displacement and rotation on the lower part 18 of the divided driving shaft. 16 are disks of resilient material which are placed between the flange of sleeve 17 and a flange at the lower end of the coupling sleeve 14, and 15 are screw bolts for holding the members of the transversely resilient coupling assembled.

22 is a casing at the lower end of the centre bearing 9. The lower end of the driving-shaft part 18 projects into the casing 22 and is equipped with a bevel gear 19. 21 is a lay shaft which extends centrally along the frame of the bogie 5 and is connected to one or both of its axles 6 by suitable mechanism, not shown, and 20 is a bevel gear on the lay shaft 21 which meshes with the bevel gear 19 on the lower end of the driving-shaft part 18.

In the example illustrated, the two couplings are combined into a single unit, 14, 13 being the sliding coupling means and 14, 16, 17 being the transversely resilient coupling means.

It will be understood that our novel power transmitting means is not in any way interfered with by, or does in any way interfere with, the relative movements of the bogie and the car body. The two units are free to move in all directions with respect to each other, and the parts of the power-transmitting means are sprung by the springs of the bogie 5.

Figure 3:
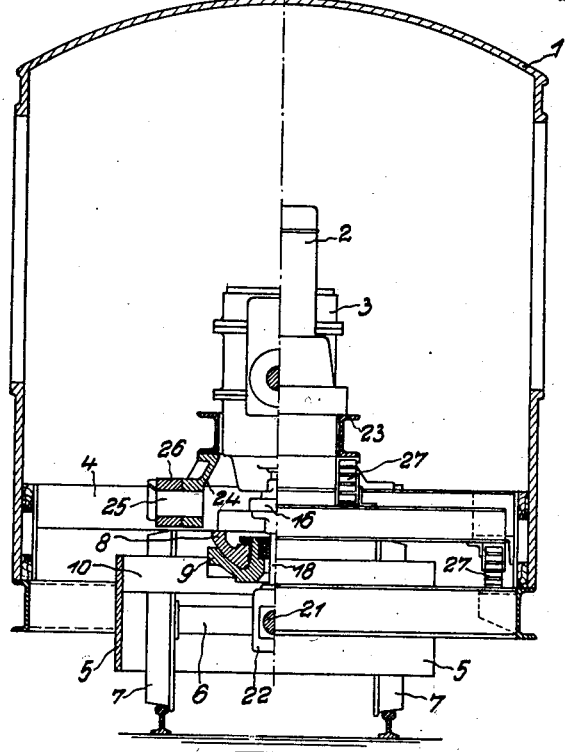
Fig. 3 is a transverse section of the vehicle, partly on the line III—III in Fig. 2.
Figure 4:
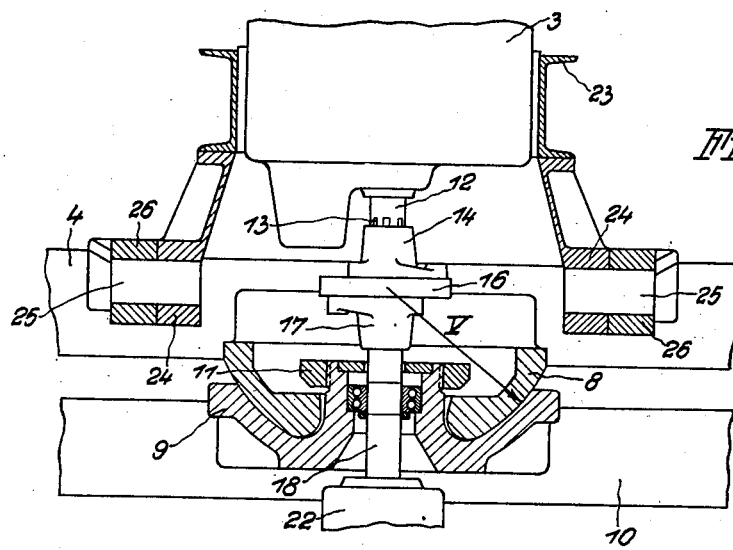
Fig. 4 shows a portion of Fig. 3, drawn to a larger scale.

The couplings, or the units into which the coupling means are combined, may be arranged in any desired position but, as mentioned, the centre of the transversely resilient coupling is preferably arranged at the centre of the sphere defining the centre bearing. Such an arrangement is illustrated in Figs. 2 to 4 and the position of the sphere centre is indicated by the arrow V in Fig. 4. With this arrangement, the relative displacement of the coupling parts is reduced to a minimum.

The frame 23, near its inner end, has eyed brackets 24, as best seen in Fig. 4, which are attached to the lower faces of its sole bars. The eye of each bracket supports a pivot pin 25, and 26 are bearing brackets for the reception of the pins 25. The brackets 26 are supported on the cross bearers 4, as best seen in Fig. 2. The pins 25 are so arranged that their axis coincides with the centre of the resilient coupling 14, 16, 17, and, in the arrangement illustrated in Figs. 2 to 4, with the centre of the sphere. The frame 23 is now free to rock about its pivots without interfering with the couplings.

The free end of the subsidiary frame 23 is supported on the principal frame of the car body 1 by resilient means such as laminated springs 27, Fig. 2. The resilient means absorbs vibrations and forces resulting from the rocking movement of the subsidiary frame 23, with the power plant on it, about the pivot pins 25. Vibrations from the power plant consequently do not act directly on the car body. The angular displacement of the two parts 12, 18 of the driving shaft is quite small for the most intense vibrations from the engine, at starting and when running idle, bring about only very slight oscillations of the car body 1 with respect to the bogie 5. While the car is running, the vibrations of the engine, i. e. the rocking movements of the subsidiary frame about its pivot pins, are insignificant and the angular relative displacement of the parts of the driving shaft are small in proportion.

A vehicle equipped with our improved power-transmitting means negotiates curves of small radius quite steadily even at the highest speeds as all vibrations, shocks etc. are rendered harmless by the universal freedom relative movement possessed by the car body and its bogie and by the described arrangement of the power plant.

We claim:

1. In a motor-driven vehicle, a frame, a bogie, pivotal means including a spherical centre bearing for supporting said frame on said bogie, a motor, a divided driving shaft extending from said motor to said bogie co-axially through said pivotal means, and a sliding coupling and a transversely resilient coupling connecting the parts of the driving shaft, the centre of said transversely resilient coupling being at the centre of the sphere defining the centre bearing.

2. In a motor-driven vehicle, a principal frame, a bogie, pivotal means for supporting said principal frame on said bogie, a subsidiary frame mounted to rock about a pivot on said principal frame, a motor on said subsidiary frame, a divided driving shaft extending from said motor to said bogie co-axially through said pivotal means, and a sliding coupling and a transversely resilient coupling connecting the parts of the driving shaft, the axis of the pivot about which said subsidiary frame is mounted to rock, being at the centre of said resilient coupling.

3. In a motor-driven vehicle, a principal frame, a bogie, pivotal means for supporting said principal frame on said bogie, a subsidiary frame mounted to rock about a pivot on said principal frame, resilient means for supporting the free end of said subsidiary frame on said principal frame, a motor on said subsidiary frame, a divided driving shaft extending from said motor to said bogie co-axially through said pivotal means, and a sliding coupling and a transversely resilient coupling connecting the parts of the driving shaft, the axis of the pivot about which said subsidiary frame is mounted to rock, being at the centre of said resilient coupling.

4. In a motor vehicle, the combination with the vehicle frame, of a motor resiliently supported on said frame, a bogie, a spherical bearing supporting said frame on said bogie, means for driving said bogie from said motor, said means including a driving shaft formed in two parts and extending through the axis of said bearing, and means connecting the shaft parts for rotation comprising an axially displaceable coupling and a resilient coupling permitting relative lateral displacement of the shaft parts.

RUDOLF HEINRICH KOPPEL.
JOSEF LINDEN.